United States Patent
Jung (10) Patent No.: US 8,143,994 B2
(45) Date of Patent: Mar. 27, 2012

(54) APPARATUS AND METHOD FOR AUTHENTICATING A TELEMATICS TERMINAL IN VEHICLE

(75) Inventor: Jin-Hyuk Jung, Gyeonggi (KR)

(73) Assignee: LG Electronics Inc., Seoul (KR)

( * ) Notice: Subject to any disclaimer, the term of this patent is extended or adjusted under 35 U.S.C. 154(b) by 932 days.

(21) Appl. No.: 11/464,862

(22) Filed: Aug. 16, 2006

(65) Prior Publication Data

US 2007/0040651 A1    Feb. 22, 2007

(30) Foreign Application Priority Data

Aug. 18, 2005  (KR) .................. 10-2005-0075855
Aug. 18, 2005  (KR) .................. 10-2005-0075927

(51) Int. Cl.
   G06F 7/04         (2006.01)
(52) U.S. Cl. ........ 340/5.1; 340/3.31; 340/5.8; 340/5.81; 340/5.28
(58) Field of Classification Search ............. 340/5.1
   See application file for complete search history.

(56) References Cited

U.S. PATENT DOCUMENTS

| | | | |
|---|---|---|---|
| 6,694,235 B2 * | 2/2004 | Akiyama ........................ | 701/33 |
| 6,845,236 B2 * | 1/2005 | Chang ........................ | 455/414.1 |
| 7,334,013 B1 * | 2/2008 | Calinov et al. ................ | 709/201 |
| 7,664,952 B2 * | 2/2010 | Eguchi et al. ................. | 713/168 |
| 2002/0046139 A1 * | 4/2002 | Ozaki et al. ..................... | 705/27 |
| 2003/0182551 A1 | 9/2003 | Frantz et al. | |
| 2003/0191949 A1 * | 10/2003 | Odagawa ..................... | 713/186 |
| 2004/0019787 A1 * | 1/2004 | Shibata ......................... | 713/168 |
| 2004/0092253 A1 * | 5/2004 | Simonds et al. ........... | 455/414.2 |
| 2004/0128558 A1 * | 7/2004 | Barrett .......................... | 713/202 |
| 2004/0152445 A1 * | 8/2004 | Muller .......................... | 455/410 |
| 2004/0156487 A1 * | 8/2004 | Ushiki et al. ............... | 379/88.22 |
| 2004/0168092 A1 * | 8/2004 | Adachi ......................... | 713/202 |
| 2004/0234109 A1 * | 11/2004 | Lemelson et al. ........... | 382/118 |
| 2005/0168340 A1 * | 8/2005 | Mosher et al. ............ | 340/572.8 |

FOREIGN PATENT DOCUMENTS

| | | |
|---|---|---|
| EP | 1376983 A2 | 1/2004 |
| EP | 1513313 A1 | 3/2005 |
| KR | 2002001052 A   * | 1/2002 |
| KR | 2004-0073329 | 8/2004 |
| KR | 10-0526857 | 11/2005 |
| WO | WO 2004/102823 A1 | 11/2004 |

OTHER PUBLICATIONS

Korean Office Action dated Feb. 20, 2007, (4 pages).
European Search Report dated Nov. 30, 2010 for Application No. 06291312.4, 8 pages.
Korea Office Action dated Sep. 27, 2006 for Korean Patent Application No. 10-2005-0075927, with English translation, 6 pages.
Joon S. Park and Ravi Sandhu (George Mason University), "Secure Cookies on the Web", IEEE Internet Computing, http://computer.org/internet/; Jul.-Aug. 2000, pp. 36-44.

* cited by examiner

*Primary Examiner* — Jennifer Mehmood
*Assistant Examiner* — Naomi Small
(74) *Attorney, Agent, or Firm* — Fish & Richardson P.C.

(57) ABSTRACT

An apparatus and method for authenticating a telematics terminal are disclosed to receive a first telematics service based on inputted user authentication information and then easily receive a second telematics service based on the inputted user authentication information. The method for authenticating a telematics terminal in a vehicle including: storing user authentication information inputted to receive a first telematics service through a mobile communication network; and requesting a second telematics service to an information providing center through the mobile communication network based on the stored user authentication information.

22 Claims, 6 Drawing Sheets

APPARATUS AND METHOD FOR AUTHENTICATING A TELEMATICS TERMINAL IN VEHICLE

BACKGROUND OF THE INVENTION

1. Field of the Invention

The present invention relates to a telematics terminal in a vehicle and, more particularly, to an apparatus and method for authenticating a telematics terminal in a vehicle.

2. Description of the Related Art

In general, a telematics terminal is mounted in a vehicle and provides a call function, map information, traffic information, multimedia information and GPS navigation function, etc., to users through a wireless communication network.

Figure 1:
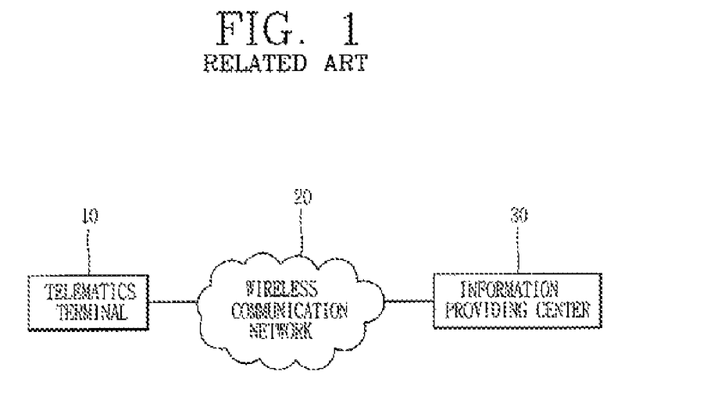
FIG. 1 is a block diagram showing a telematics system according to a related art.

FIG. 1 is a block diagram showing a telematics system according to a related art.

As shown in FIG. 1, the related art telematics system includes an information providing center 30 for providing telematics service information such as the call function, the map information, the traffic information and the multimedia information; and a telematics terminal 10 mounted within a vehicle, receiving the telematics service information through a wireless communication network 20, and provides the telematics service information to a user. Herein, by inputting authentication information to the telematics terminal, the user can use the telematics service information through the telematics terminal 10.

However, with the related art telematics terminal 10, the user should input the user authentication information whenever he/she uses the telematics service, causing user inconvenience.

In addition, when currently inputted authentication information is not identical to pre-set user authentication information, the related art telematics terminal 19 just cuts off (prevents) the telematics service information. For example, when the currently inputted authentication information is not identical to the pre-set user authentication information, the related art telematics terminal simply prevents the telematics service information, causing a problem that it cannot discriminate whether the authentication information has been inputted by an actual user (e.g., an owner of a vehicle) or inputted by someone else. Thus, although the vehicle of the owner has been stolen by a person and erroneous authentication information has been inputted by the person, the owner of the vehicle cannot promptly know about the fact that his/her vehicle has been stolen.

SUMMARY OF THE INVENTION

One exemplary feature of the present invention is to provide an apparatus and method for authenticating a telematics terminal capable of receiving a first telematics service based on inputted user authentication information and then easily receiving a second telematics service based on the inputted user authentication information.

Another exemplary feature of the present invention is to provide an apparatus and method for authenticating a telematics terminal capable of allowing an owner of a vehicle to quickly determine whether or not his/her vehicle has been stolen by promptly providing an authentication failure message informing that user authentication of a telematics terminal mounted within a vehicle has been failed as occurs.

To implement at least the above feature in whole or in parts, the present invention provides a method for authenticating a telematics terminal in a vehicle including: storing user authentication information inputted to receive a first telematics service through a mobile communication network; and requesting a second telematics service to an information providing center through the mobile communication network based on the stored user authentication information.

To implement at least the above feature in whole or in parts, the present invention also provides a telematics terminal in a vehicle including: a storage unit for storing user authentication information to receive a first telematics service through a mobile communication terminal; and a controller for requesting a second telematics service from an information providing center based on the stored user authentication information through the mobile communication network.

To implement at least the above feature in whole or in parts, the present invention provides a method for authenticating a telematics terminal in a vehicle including: storing user authentication information inputted to receive a first telematics service through a mobile communication network; requesting a second telematics service to an information providing center through the mobile communication network based on the stored user authentication information; maintaining the user authentication information for a predetermined time period or while the telematics terminal is being turned on; and deleting the stored user authentication information when the telematics terminal is turned off.

To implement at least the above feature in whole or in parts, the present invention provides a method for authenticating a telematics terminal in a vehicle including: requesting user authentication information of a telematics terminal in a vehicle; storing the user authentication information inputted in response to the request; requesting a first telematics service including at least one or more of a telephone function, map information, traffic information and multimedia information based on the stored user authentication information from an information providing center through a mobile communication network; requesting a second telematics service from the information providing center based on the stored user authentication information through the mobile communication network; maintaining the user authentication information for a predetermined time period or while the telematics terminal is being turned on; and deleting the stored user authentication information when the telematics terminal is turned off, wherein when the inputted user authentication information and pre-set authentication information are not identical, an authentication failure message is generated and transmitted to a communication device through the mobile communication network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

An apparatus and method for authenticating a telematics terminal capable of receiving a first telematics service based on inputted user authentication information and then easily receiving a second telematics service based on the inputted user authentication information according to exemplary embodiments of the present invention will be described with reference to FIGS. 2 and 3.

Figure 2:
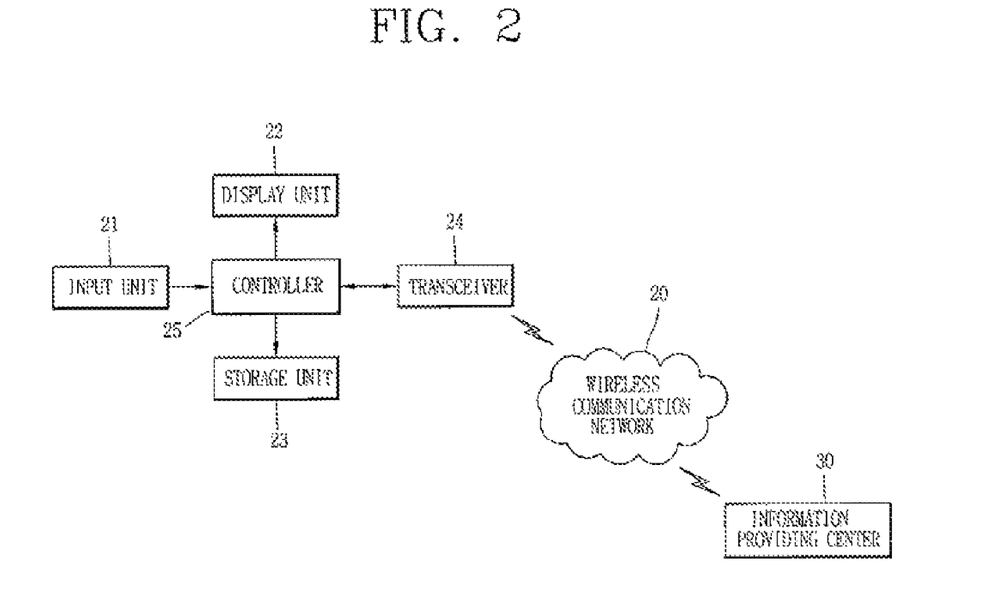
FIG. 2 is a schematic block diagram showing an apparatus for authenticating a telematics terminal according to a first embodiment of the present invention.

FIG. 2 is a schematic block diagram showing an apparatus for authenticating a telematics terminal according to a first embodiment of the present invention.

As shown in FIG. 2, the apparatus for authenticating a telematics terminal according to a first embodiment of the present invention includes: an input unit 21 for inputting user authentication information according to a first telematics service request; a storage unit 23 for storing the user authentication information; a transceiver 24 for transmitting the user authentication information to an information providing center 30 through a mobile communication network 20 or receiving user authentication request information; and a controller 25 for displaying user authentication information stored in the storage unit 23 on a screen of a display unit 22 when a second telematics service is requested by a user, and outputting selected user authentication information to the transceiver 24 when the user authentication information displayed on the screen of the display unit 22 is selected by the user. In this case, the transceiver 24 transmits the selected user authentication information to the information providing center 30 through the wireless communication network 20.

The operation of the apparatus for authenticating the telematics terminal according to the first exemplary embodiment of the present invention will now be described in detail with reference to FIG. 2.

First, when the first telematics service is requested by the user, the input unit 21 outputs a request signal for requesting the first telematics service to the controller 25.

The controller 25 transmits the request signal to the information providing center 30 through the transceiver 24. In this case, the information providing center 30 checks whether the first telematics service requires user authentication, and if the first telematics service requires user authentication, the information providing center 30 outputs a request signal for requesting user authentication information to the controller 25 through the transceiver 30.

The controller 25 receives the request signal for requesting the user authentication information, and if the user authentication information has not been stored in the storage unit 23 (e.g., when the telematics terminal is turned on to first use a telematics service), the controller 25 generates a message for requesting the user authentication information and outputs the message on the display unit 22. In this case, the display unit 22 displays the message on its screen.

When the user authentication information is inputted by the user, the input unit 21 outputs the inputted user authentication information to the controller 25.

The controller 25 outputs the user authentication information to the storage unit 23 and the transceiver 24. In this case, the storage unit 23 stores the user authentication information and the transceiver 24 transmits the user authentication information to the information providing center 30 through the wireless communication network.

Thereafter, when the second telematics service is requested by the user, the input unit 21 outputs a request signal for requesting the second telematics service to the controller 25.

The controller 25 transmits the request signal to the information providing center 30 through the transceiver 24. In this cast, the information providing center 30 checks whether the second telematics service requires user authentication. If the second telematics service requests user authentication, the information providing center 30 outputs a request signal for requesting the user authentication information to the controller 25 through the transceiver 30.

When the request signal for requesting the user authentication information is received, the controller 25 checks whether the user authentication information has been stored in the storage unit 23. When the user authentication information exists in the storage unit 23, the controller reads the user authentication information for the storage unit 23 and displays the read user authentication information on the screen of the display unit 22.

Thereafter, when the user authentication information displayed on the screen of the display unit 22 is selected by the user, the controller 25 transmits the selected user authentication information to the information providing center 30 through the transceiver 24.

If, however, the transmitted user authentication information is not valid for the second telematics service (e.g., when the second telematics service is a special service that incurs a high cost, not a basic service), the information providing center 30 requests the user authentication from the controller 25 of the telematics terminal and the controller 25 displays the request information for requesting the user authentication information for receiving the second telematics service on the screen of the display unit 22. In this case, the user can input new user authentication information to the input unit 21.

The method for authentication the telematics terminal according to the first exemplary embodiment of the present invention will be described in detail with reference to FIGS. 2 and 3.

Figure 3:
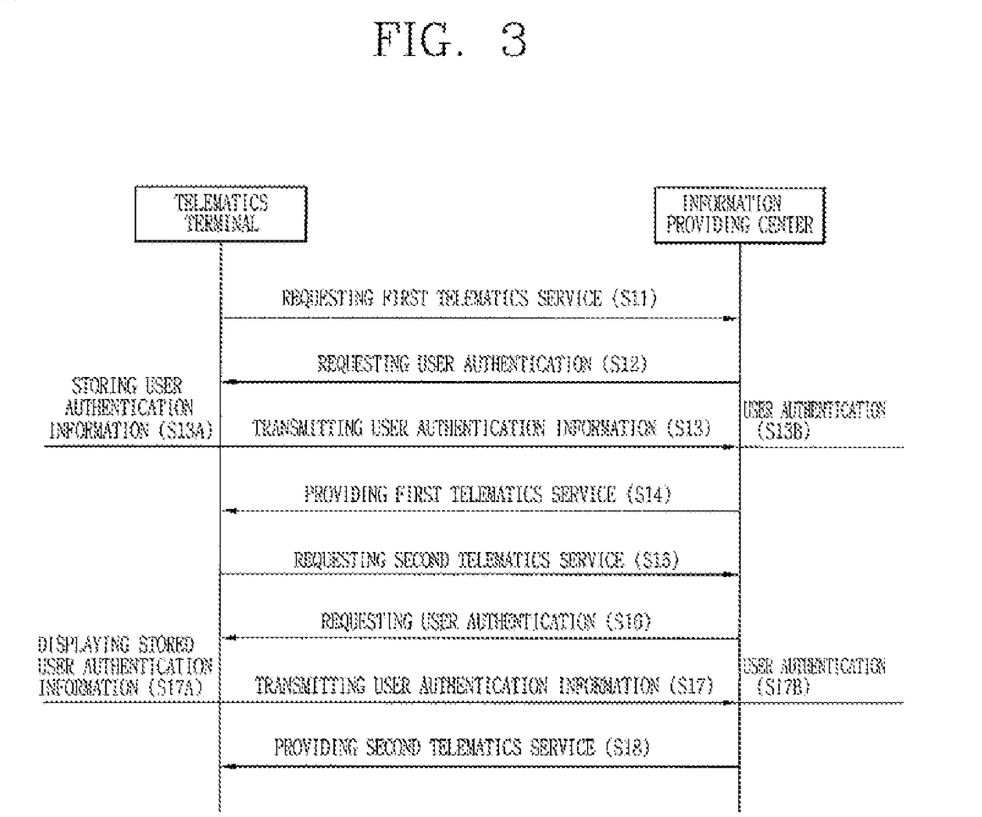
FIG. 3 is a flow chart illustrating the processes of a method for authenticating the telematics terminal according to the first embodiment of the present invention.

FIG. 3 is a flow chart illustrating the processes of a method for authenticating the telematics terminal according to the first embodiment of the present invention.

First, when the first telematics service is requested by the user, the input unit 21 outputs the request signal (or request information) for requesting the first telematics service to the controller 25 (step S11).

The controller 25 transmits the request signal to the information providing center 30 through the transceiver 24. The information providing center 30 checks whether the first telematics service requires user authentication. When the first telematics service requires the user authentication, the information providing center 30 outputs the request signal for requesting the user authentication information to the controller 25 through the transceiver 30 (step S12).

The controller 25 receives the request signal for requesting the user authentication information, and when the user authentication information has not been stored in the storage unit 23 (e.g., when the telematics terminal is turned on and first uses the telematics service), the controller 25 generates a message for inputting the user authentication information and outputs the message to the display unit 22. Then, the display unit 22 displays the message on the screen.

When the user authentication information is inputted by the user, the input unit 21 outputs the user authentication information to the controller 25.

The controller 25 outputs the user authentication information to the storage unit 23 and the transceiver 24 (step S13). At this time, the storage unit 23 stores the user authentication information (step S13A, and the transceiver 24 transmits the user authentication information to the information providing center 30 through the wireless communication network (step S13B). Herein, the information providing center 30 checks the validity of the user authentication information, and if the user authentication information is identical to pre-set user authentication information, the information providing center 30 provides the first telematics service (step S14).

Thereafter, when the second telematics service is requested by the user, the input unit 21 outputs the request signal for requesting the second telematics service to the controller 25 (step S25).

The controller 25 transmits the request signal to the information providing center 30 through the transceiver 24. Then, the information providing center 30 checks whether the second telematics service requires user authentication. If the second telematics service requests user authentication, the information providing center 30 outputs the request signal for requesting the user authentication information to the controller 25 through the transceiver 30 (step S16).

When the controller 25 receives the request signal for requesting user authentication information, it checks whether the storage unit 23 stores the user authentication information. The controller 25 searches the user authentication information from the storage unit 23, and when the user authentication information exists in the storage unit 23, the controller 25 reads the user authentication information from the storage unit 23 and displays the read user authentication information on the screen of the display unit 22 (step S17A). If, however, the user authentication information does not exist in the storage unit 23, the controller 25 requests the user to input user authentication information and transmits user authentication information inputted by the user to the information providing center 30.

Thereafter, when the user authentication information displayed on the screen of the display unit 22 is selected by the user, the controller 25 transmits the selected user authentication information to the information providing center 30 through the transceiver 24 (step S17). In this case, when the user authentication information is identical to the pre-set user authentication information, the information providing center 30 provides the second telematics service to the telematics terminal (step S18).

Herein, in terms of security, the controller may maintain the user authentication information only during a predetermined time period or while the telematics terminal is being turned on, and may delete the stored user authentication information when the telematics terminal is turned off.

In this manner, according to the authenticating apparatus and method according to the first embodiment of the present invention, after the first telematics service is received based on the inputted user authentication information, the second telematics service can be easily received based on the inputted user authentication information. For example, when the telematics service that requires user authentication is accessed, the telematics terminal transmits the user authentication information to the information providing center and at the same time stores the user authentication information, and then receives the new telematics service based on the stored user authentication information. Thus, the user authentication procedure can be simplified.

In addition, if the transmitted user authentication information is not valid for the telematics service (e.g., when the telematics service is not a basic service but a special service that incurs a high cost), the information providing center can request the user authentication from the telematics terminal again and the controller 23 can display the user authentication re-requesting message through the display unit 22. Accordingly, when the telematics terminal is in an OFF state, a non-authorized user can be prevented from receiving the telematics service that incurs a high cost.

An apparatus and method for authenticating the telematics terminal capable of allowing an owner of a vehicle to promptly recognize whether or not his/her vehicle has been stolen by quickly providing the owner an authentication failure message informing that user authentication of a telematics terminal mounted in the vehicle has been failed as occurs according to exemplary embodiments of the present invention will now be described in detail with reference to FIGS. 4 to 7.

Figure 4:
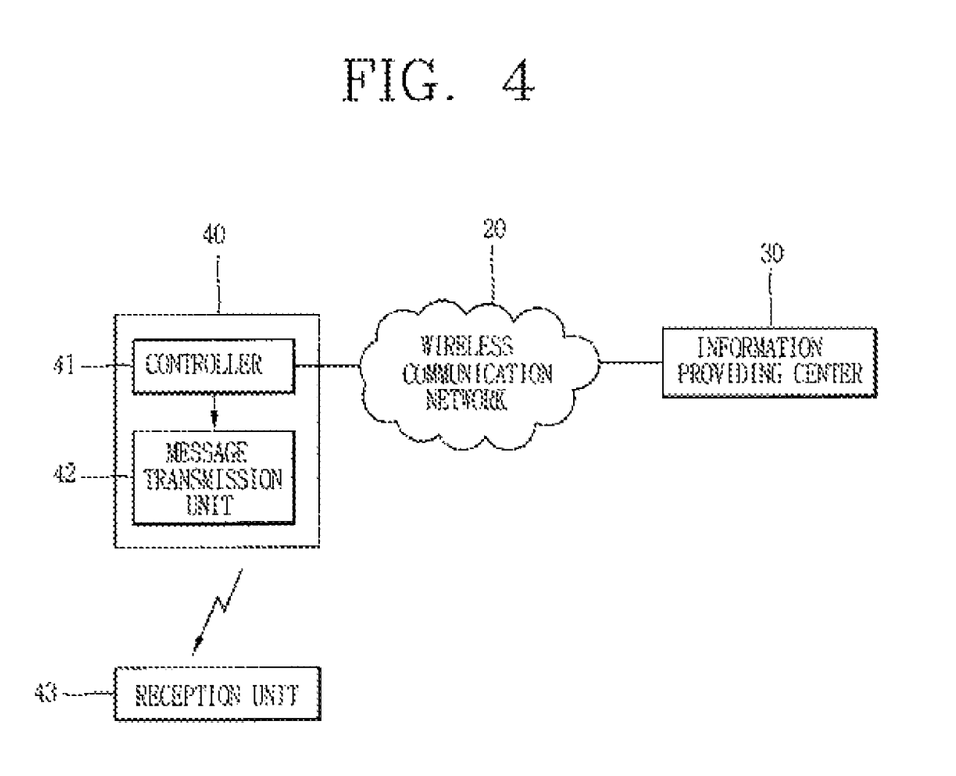
FIG. 4 is a schematic block diagram showing an apparatus for authenticating a telematics terminal according to a second embodiment of the present invention.

FIG. 4 is a schematic block diagram showing an apparatus for authenticating a telematics terminal according to a second embodiment of the present invention;

As shown in FIG. 4, an apparatus 40 for authenticating a telematics terminal according to the second embodiment of the present invention includes: a controller 41 for requesting authentication information of the telematics terminal mounted in a vehicle when the telematics terminal is turned on, and generating an authentication failure message informing that authentication of the telematics terminal has been failed as authentication information inputted by a user in response to the request is not identical to pre-set authentication information; and a message transmission unit 42 for transmitting the authentication failure message to a reception unit 43 through wireless communication.

The reception unit 43 is a short distance wireless communication device previously determined by the owner of the vehicle corresponding to the pre-set authentication information and can be a communication device having a Bluetooth function. In this case, the message transmission unit 42 transmits the authentication failure message to the reception unit 43 of the owner of the vehicle through the short distance communication device such as the Bluetooth.

The operation of the apparatus for authenticating the telematics terminal according to the second embodiment of the present invention will now be described in detail with reference to FIGS. 4 and 5.

Figure 5:
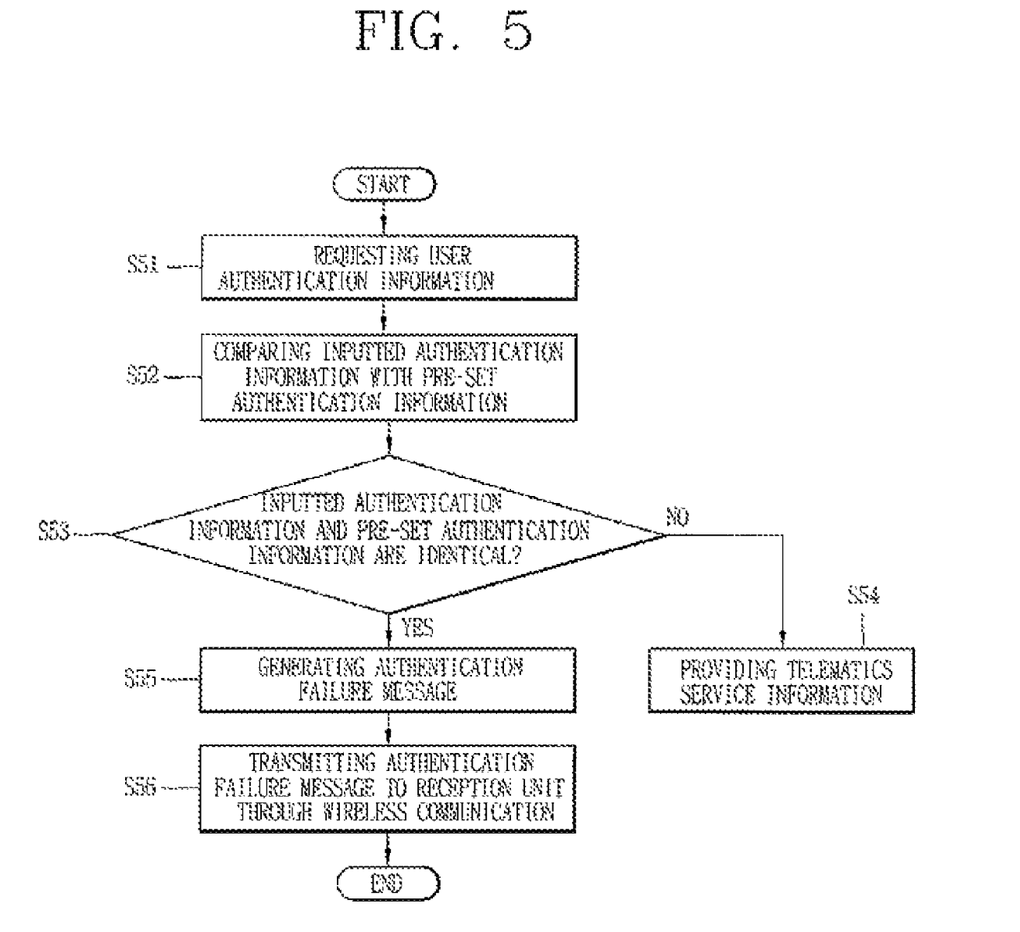
FIG. 5 is a flow chart illustrating the processes of a method for authenticating the telematics terminal according to the second embodiment of the present invention.

FIG. 5 is a flow chart illustrating the processes of a method for authenticating the telematics terminal according to the second embodiment of the present invention.

First, when the telematics terminal 20 mounted in the vehicle is turned on, the controller 41 requests user authentication information (step S51).

When a user inputs the authentication information in response to the request, the controller 41 compares the inputted authentication information and the pre-set authentication information (step S52).

When the inputted authentication information is identical to the pre-set authentication information (step S53), the controller 41 provides a service requested by the user (step S54). For example, when the inputted authentication information and the pre-set authentication information are identical, the controller 41 receives telematics service information such as a call function, map information, traffic information and multimedia information, etc. from the information providing center 30 through the wireless communication network 20, and provides the received telematics service information to the user (step S54). Herein, the technique for providing the telematics service information to the telematics terminal through the wireless communication network 20 is the same as that in the related art, so its detailed description will be omitted.

If, however, the inputted authentication information is not identical to the pre-set authentication information, the controller 41 generates an authentication failure message informing that authentication of the telematics terminal has been failed, and outputs the generated authentication failure message to the message transmission unit 42 (step S55).

The message transmission unit 42 transmits the authentication failure message received from the controller 41 to the reception unit 43 of the owner of the vehicle through the wireless communication device (e.g., the Bluetooth device) (step S56). Then, the owner of the vehicle can easily determine whether the cause of the authentication of the telematics terminal has been generated by him/her or whether it has been generated by someone else through the authentication failure message displayed on the reception unit 43, thereby quickly recognizing whether or not his/her vehicle has been stolen.

Also, the message transmission unit 42 can transmit the authentication failure message to a mobile terminal such as a mobile phone through the wireless communication network 20.

An apparatus for authenticating a telematics terminal according to a third embodiment of the present invention will be described with reference to FIG. 6.

Figure 6:
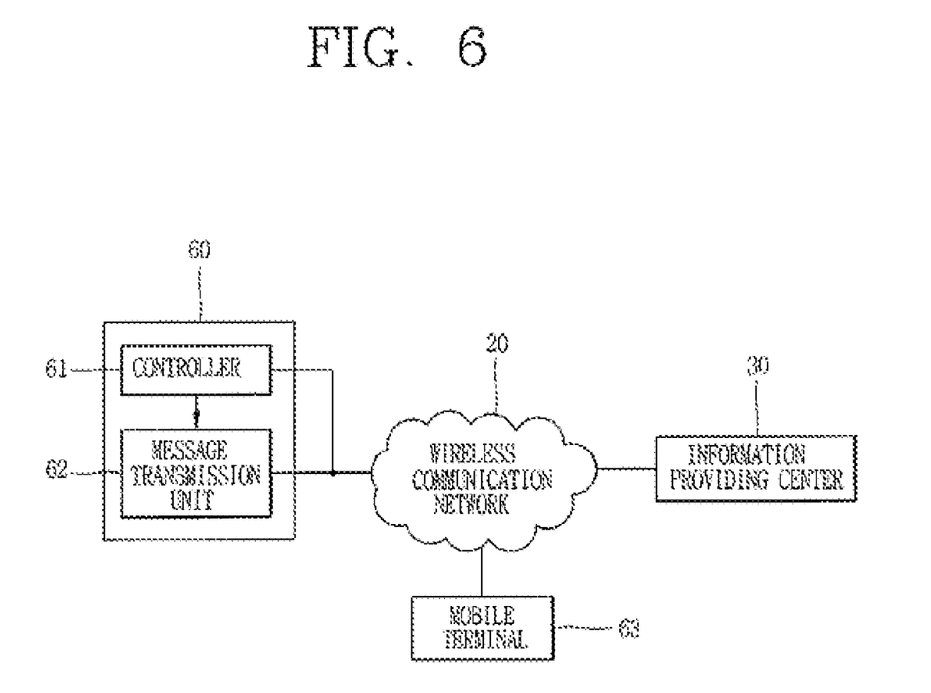
FIG. 6 is a schematic block diagram showing an apparatus for authenticating a telematics terminal according to a third embodiment of the present invention.

FIG. 6 is a schematic block diagram showing an apparatus for authenticating a telematics terminal according to a third embodiment of the present invention.

As shown in FIG. 6, an apparatus 60 for authenticating a telematics terminal according to the third embodiment of the present invention includes: a controller 61 for requesting authentication information of the telematics terminal mounted in a vehicle when the telematics terminal is turned on, and generating an authentication failure message informing that authentication of the telematics terminal has been failed as authentication information inputted by a user in response to the request is not identical to pre-set authentication information; and a message transmission unit 62 for transmitting the authentication failure message to an information providing center 30 through the wireless communication network 20.

Herein, the information providing center 30 transmits the authentication failure message to a mobile terminal 63 previously determined by the owner of the vehicle corresponding to the pre-set authentication information through the wireless communication network 20. Accordingly, the owner of the vehicle can check the authentication failure message in a short distance area or from a remote area and easily determine whether or not his/her vehicle has been stolen based on the authentication failure message.

The operation of the apparatus for authenticating the telematics terminal according to the third embodiment of the present invention will now be described in detail with reference to FIGS. 6 and 7.

Figure 7:
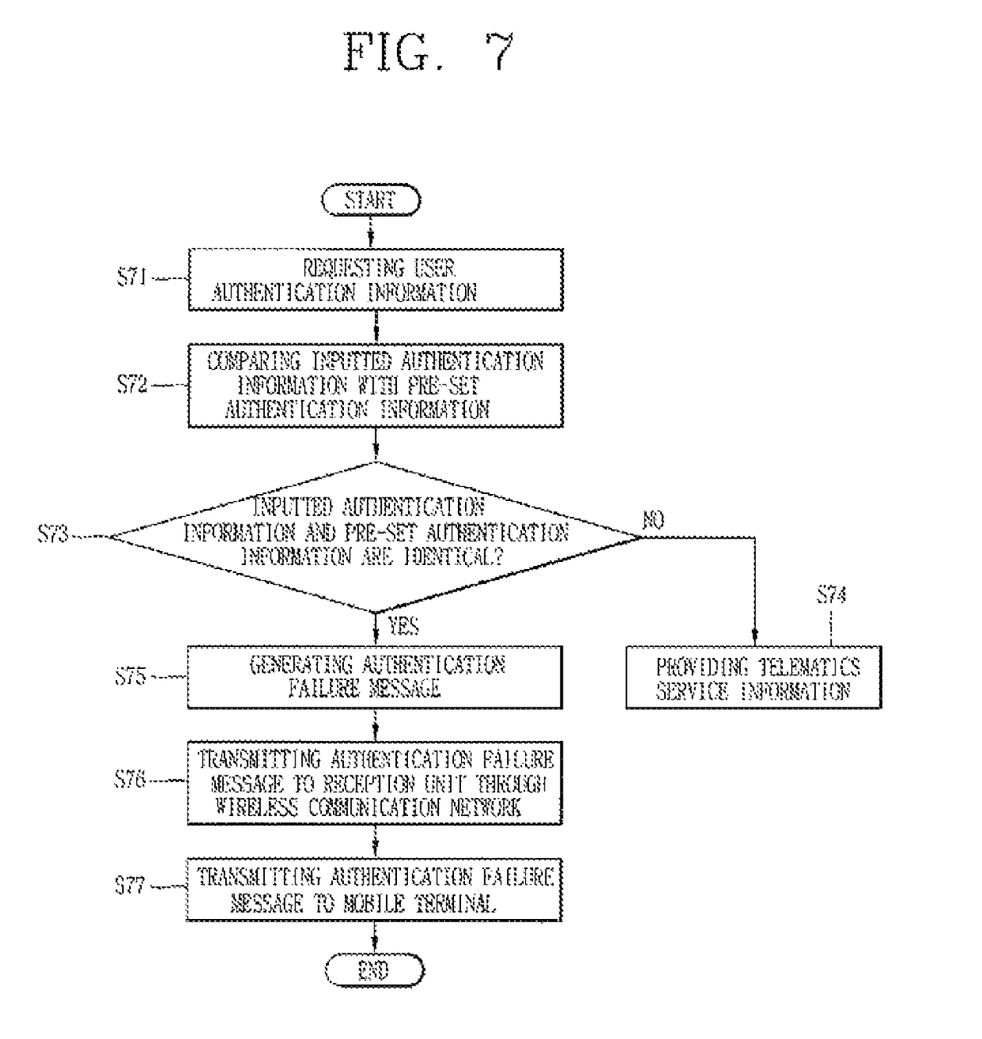
FIG. 7 is a flow chart illustrating the processes of a method for authenticating the telematics terminal according to the third embodiment of the present invention.

FIG. 7 is a flow chart illustrating the processes of a method for authenticating the telematics terminal according to the third embodiment of the present invention;

First, when the telematics terminal mounted in the vehicle is turned on, the controller 61 requests user authentication information (step S71).

When a user inputs the authentication information in response to the request, the controller 61 compares the inputted authentication information and the pre-set authentication information (step S72).

When the inputted authentication information is identical to the pre-set authentication information (step S73), the controller 61 provides a service requested by the user (step S74).

If, however, the inputted authentication information is not identical to the pre-set authentication information, the controller 61 generates an authentication failure message informing that authentication of the telematics terminal has been failed, and outputs the generated authentication failure message to the message transmission unit 42 (step S75).

The message transmission unit 62 transmits the authentication failure message received from the controller 61 to the information providing center 30 through the wireless communication network 20 (step S76).

Thereafter, the information providing center 30 transmits the authentication failure message corresponding to the pre-set authentication information to the mobile terminal 63 previously determined by the owner of the vehicle (step S77). Accordingly, the owner of the vehicle can easily determine whether or not the cause of the authentication failure of the telematics terminal has been generated by him/her or whether it has been generated by someone else through the authentication failure message displayed on the mobile terminal 63. That is, the owner of the vehicle can quickly determine whether or not his/her vehicle has been stolen from a short distance area or remote area.

The message transmission unit 62 can directly transmit the authentication failure message directly to the mobile terminal 63 through the wireless communication network 20, without going by way of the information providing center 30.

As so far described, according to the authenticating apparatus and method according to the first embodiment of the present invention, after the first telematics service is received based on the inputted user authentication information, the second telematics service can be easily received based on the inputted user authentication information. For example, when the telematics service that requires user authentication is accessed, the telematics terminal transmits the user authentication information to the information providing center and at the same time stores the user authentication information, and then the new telematics service can be received based on the stored user authentication information. Thus, the user authentication procedure can be simplified.

According to the apparatus and method for authenticating the telematics terminal according to the second and third embodiments, when the user authentication of the telematics terminal is failed, the authentication failure message is quickly provided to the owner of the vehicle to allow the owner of the vehicle to be quickly determined whether or not his/her vehicle has been stolen. For example, when the owner of the vehicle stays at home, if the authentication failure message is received by the reception unit or the mobile terminal, the owner of the vehicle can promptly recognize whether or not his/her vehicle has been stolen.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for authenticating a user of a telematics terminal in a vehicle comprising:

receiving, by the telematics terminal and from a user, first user authentication information from a time when a request is made for a first telematics service provided through a mobile communication network, which time follows the telematics terminal being turned on;

transmitting, by the telematics terminal, the received first user authentication information to an information providing center in order to receive the first telematics service, wherein the information providing center previously stored first user authentication information for comparison with the received first user authentication information;

storing, by the telematics terminal, the received first user authentication information;

maintaining, by the telematics terminal, the stored first user authentication information while the telematics terminal remains turned on;

upon receiving a request for a second telematics service before the telematics terminal is turned off, reusing, by the telematics terminal, the stored first user authentication information, thereby to transmit the stored first user authentication information to the information providing center through the mobile communication network, in order to receive the second telematics service without action by the user to provide authentication for the second telematics service;

receiving, by the telematics terminal, a re-authentication request from the information providing center when the second telematics service is determined to be a special service; and in response to receiving the re-authentication request,
  requesting, by the telematics terminal, and receiving second user authentication information from the user; and
  when the received second user authentication information is not valid, transmitting, by the telematics terminal, a failure message, which notifies the user of the telematics terminal that the authentication information was not valid, to a communication device other than the telematics terminal, the communication device having been previously designated by the user of the telematics terminal such that a status of the vehicle and the telematics terminal is provided to the user by means of the communication device,
  wherein the information providing center previously stored the same second user authentication information thereby to compare, for the second telematics service, the received second user authentication information to the previously stored same second user authentication information.

2. The method of claim 1, further comprising:
deleting the stored first user authentication information when the telematics terminal is turned off.

3. The method of claim 1, further comprising:
requesting the first telematics service from the information providing center.

4. The method of claim 1, wherein requesting the second telematics service comprises:
displaying the stored first user authentication information; and
receiving from the user a selection with respect to the displayed user authentication information.

5. The method of claim 1, further comprising:
generating an authentication failure message when the inputted second user authentication information is not identical pre-set authentication information.

6. The method of claim 1, wherein, transmitting the authentication failure message includes transmitting the authentication failure message to a communication device previously determined by a user corresponding to the pre-set authentication information.

7. The method of claim 1, wherein transmitting the authentication failure message comprises:
transmitting the authentication failure message to the information providing center through the mobile communication network; and
transmitting the authentication message, which has been transmitted to the information providing center, to the communication device through the mobile communication network.

8. The method of claim 7, wherein the information providing center provides a telematics service including at least one or more of a call function, map information, traffic information and multimedia information.

9. A telematics terminal in a vehicle comprising:
a transceiver;
a input unit for receiving from a user first user authentication information when a first telematics service through a mobile communication network is requested after the telematics terminal is turned on;
a storage unit for storing the received first user authentication and maintaining the stored first user authentication information while the telematics terminal is being turned on; and
a controller adapted to control:
  the transceiver to:
    transmit the received first user authentication information to an information providing center when the first telematics service is requested,
    reuse, upon receiving a request for a second telematics service before the telematics terminal is turned off, the stored first user authentication information, thereby to transmit the stored first user authentication information to the information providing center through the mobile communication network, in order to receive the second telematics service without action by the user to provide authentication for the second telematics service, and
    receive a re-authentication request from the information providing center when the second telematics service is determined to be a special service; and
  the input unit to receive second user authentication information from the user in response to the re-authentication request,
  wherein, when the received second user authentication information is not valid, the transceiver transmits a failure message, which notifies the user of the telematics terminal that the authentication information was not valid, to a communication device other than the telematics terminal, the communication device having been previously designated by the user of the telematics terminal such that a status of the vehicle and the telematics terminal is provided to the user by means of the communication device,
  wherein if the received second user authentication information is valid the transceiver transmits the received second user authentication information to the information providing center, and wherein the information providing center previously stored first and second user authentication information for comparison with the received first and second user authentication information.

10. The terminal of claim 9, wherein the controller deletes the first user authentication information stored in the storage unit when the telematics terminal is turned off.

11. The terminal of claim 9, wherein the controller requests the second telematics service from the information providing center, displays the stored first user authentication information on a display unit of the telematics terminal in response to the request of the second telematics service, and transmits selected user authentication information to the information providing center through the mobile communication network when the displayed user authentication information is selected, and when the telematics terminal is turned off, the controller deletes the stored user authentication information.

12. The terminal of claim 9, wherein the controller requests input of user authentication information when there is no user authentication information stored in the telematics terminal.

13. The terminal of claim 9, further comprising a communication, wherein the communication device is a short distance wireless communication device.

14. The terminal of claim 9, further comprising a communication device, wherein the communication device is a mobile communication terminal.

15. The terminal of claim 9, wherein the information providing center provides a telematics service including at least one or more of a call function, map information, traffic information and multimedia information.

16. The method of claim 1, further comprising preventing a non-authorized user from receiving any telematics service when the telematics terminal is turned off.

17. The method of claim 16, further comprising deleting the stored first user authentication information when the telematics terminal is turned off.

18. The method of claim 1, further comprising, after receiving the re-authentication request from the information providing center, checking a storage unit for stored user authentication information for the second telematics service.

19. The method of claim 18, further comprising, when the stored user authentication information does not exist in the storage unit, performing the requesting and receiving again of the user authentication information from the user, and transmitting the received user authentication information to the information providing center.

20. The method of claim 19, further comprising, when the stored user authentication information exist in the storage unit:

reading the stored user authentication information from the storage unit; and terminating operations for performing the requesting and receiving second user authentication information from the user.

21. The method of claim 1, further comprising maintaining the stored user authentication information during the predetermined time period with a controller.

22. The method of claim 1, wherein the communication device previously designated by the user of the telematics terminal is a mobile phone of the user, and transmitting, by the telematics terminal, the failure message to the communication device other than the telematics terminal includes transmitting, by the telematics terminal, the failure message to the mobile phone of the user through a wireless communication network.

* * * * *